UNITED STATES PATENT OFFICE.

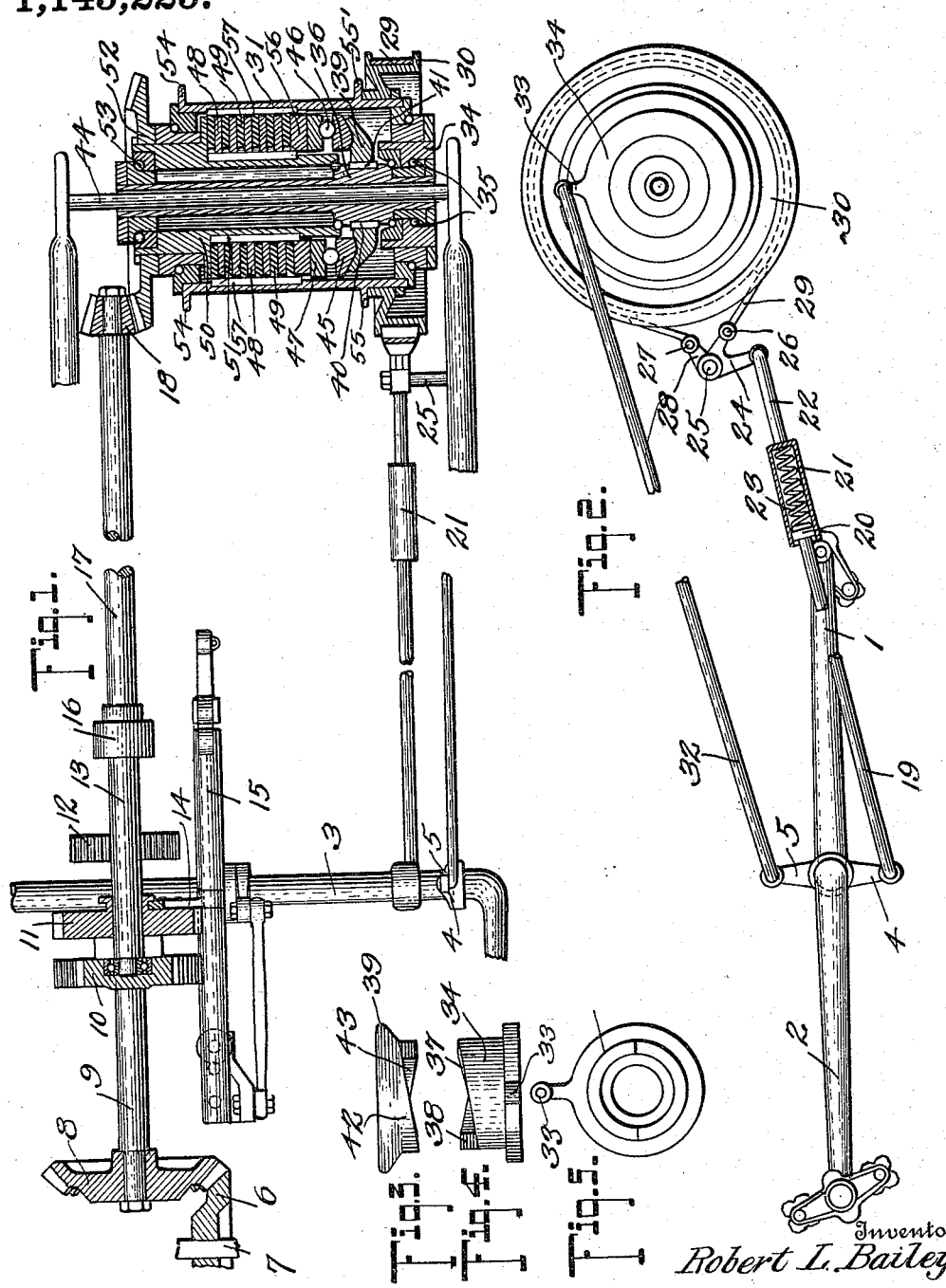

ROBERT L. BAILEY, OF PORTLAND, OREGON, ASSIGNOR TO A. L. MacLEOD, OF PORTLAND, OREGON.

CLUTCH MECHANISM FOR MOTOR-CYCLES.

1,145,225. Specification of Letters Patent. Patented July 6, 1915.

Original application filed February 19, 1912, Serial No. 678,472. Divided and this application filed May 6, 1912, Serial No. 695,406. Renewed November 4, 1914. Serial No. 870,305.

*To all whom it may concern:*

Be it known that I, ROBERT L. BAILEY, a citizen of the United States, residing at Portland, in the county of Multnomah and State of Oregon, have invented certain new and useful Improvements in Clutch Mechanism for Motor-Cycles, of which the following is a specification.

This invention relates to clutch mechanism particularly adapted for use in the propulsion of motorcycles, and has for its object to provide means whereby the rear wheel of a motorcycle may be thrown into and out of operation by pressure exerted on one of the pedals.

The invention further provides means whereby a brake may be applied to the rear wheel on the application of pressure to the other pedal, said means being automatically rendered inoperative at the time of throwing the clutch into operation on the application of pressure to the first named pedal.

For a full understanding of the present invention, reference is to be had to the following description and to the accompanying drawings, in which—

Figure 1 is a view, partly in horizontal section, and partly in plan, showing the invention applied to the rear wheel of a motorcycle, and showing the connections with the pedals. Fig. 2 is a side elevation of the device. Figs. 3, 4 and 5 are detail views hereinafter particularly referred to.

Throughout the following detail description and on the several figures of the drawings, similar parts are referred to by like reference characters.

Referring to the drawings by numerals, 1 indicates the right pedal of a motor cycle, 2 the left pedal and 3 the crank shaft carrying the same. Diametrically oppositely disposed, radially extending crank arms 4 and 5 are fixed to the crank shaft 3 and are spaced laterally thereon. The crank arms of the shaft 3, that is the arms carrying pedal 2, are disposed in planes substantially at right angles to the planes of the crank firms 4 and 5.

The engine shaft 7 carries a mitered gear 6 which meshes with a similar gear 8 fixed on shaft 9, for driving the latter shaft, the said shaft 9 thus forming the main drive shaft of the motor cycle.

This application is a division of my earlier filed co-pending application, Serial Number 678,472, filed February 19th, 1912, for a patent for improvements in motor cycles, in which was originally disclosed in detail the transmission mechanism in part illustrated in the accompanying drawing, said transmission mechanism having subsequently been made the subject matter of my divisional application filed May 6th, 1912, Serial Number 695,407. Hence the transmission mechanism is not illustrated in the accompanying drawing in minute detail but only sufficiently for being understood in its general construction and arrangement. Such transmission mechanism, as shown in the accompanying drawing, consists of the gear wheels 10, 11 and 12, the first being fixed on the main drive shaft 9 and the second being slidingly mounted on a shaft 13. Gear 12 is fixed on a stub shaft, not illustrated. Gears 10 and 11 are provided with coöperating clutch members on their adjacent faces adapted to be thrown into and out of engagement by the lateral shifting of the gear 11 along the shaft 13. Thus shaft 13 and shaft 9 may be connected for direct drive, the movement to and from the clutch-engaging position being adapted to be effected through the shifting of a yoke 14 which engages a suitable sleeve on gear 11. The yoke 14 is carried by a reciprocating rod 15 which latter is adapted to be shifted by a mechanism not illustrated but forming part of the subject-matter of the above identified co-pending divisional application. The shifting of the rod 15 is controlled, as indicated in Fig. 1, by locking apparatus adapted to be actuated by the crank shaft 3.

16 represents a universal joint connected with the shaft 13 and with the shaft 17, which latter constitutes the drive shaft for the hub of the rear wheel. The rear end of the drive shaft 17 carries a bevel gear wheel 18, of the form particularly shown in Fig. 1, and constitutes the means by which the rear wheel is driven, the wheel 18 always revolving with the shaft 17.

Connected to the lower end of the crank 4, the connection preferably being pivotal, is a rod 19 extending slightly upwardly from a horizontal plane and carrying at its rear end a plunger 20, which is rigidly secured to the rod. The plunger works in a spring barrel 21, which latter is integral with a rod 22. A coiled spring 23 is disposed within the spring barrel 21 and is connected to the end thereof adjacent to the rod 22, the spring acting on the plunger 20. The rod 22 is connected with a bell crank lever 24 pivoted on the shaft 25, the shaft being connected in any desired manner with the frame of the machine. At the point 26 of the bell crank lever particularly shown in Fig. 2 and at point 27 on the link 28 rigidly connected with the lever, are connected the two free ends of a brake band 29 which, as is shown in Fig. 2 passes entirely around the brake drum 30. The brake drum 30 is rigidly connected to the outer hub 31 of the rear wheel so that when the brake band 29 is tightened, a braking action may be applied to the rear wheel so as to reduce the speed of the same. When downward pressure is applied to the right pedal 1, the crank 4 is moved to the left, as seen in Fig. 2, thus also moving the rod 19 in the same direction. This will cause the plunger 20 to move through the spring barrel 21, thus placing the coiled spring 23 under tension. As the end of the coiled spring is connected to the end of the spring barrel where the rod 22 joins the same, this will result in the spring moving the spring barrel to the left, thus turning the bell crank lever 24 on its axis and, in a manner which will be obvious, tightening the brake band 29 about the brake drum 30. This will result in the speed of the rear wheel being reduced, or in the wheel being brought to a full stop.

The purpose of the arrangement of the rods 19 and 22 and spring barrel 21 with its contained spring, is to provide a device which will be adapted to take up lost motion and which will automatically effect the loosening of the brake band when the clutch mechanism hereinafter described, is brought into operation by pressure on the left pedal 2. I will now proceed to particularly describe the manner in which the clutch mechanism is operated.

A rod 32 is connected preferably in a pivotal manner to the upstanding crank 5, the rod 32 extending in generally the same direction as the rod 19, and being connected at its rear end with an ear 33, which latter is integrally connected to the outer periphery of an outer pressure piece 34, the arrangement and disposition of which is shown in Figs. 1 and 2. The outer pressure piece 34 is adapted to move on the ball bearings 35 and around the inner hub 36, which latter is best shown in Fig. 1. It will be apparent that on the application of downward pressure to the left pedal 2, the upstanding crank will be moved to the left, as seen in Fig. 2, which action will result in pulling the rod 32 in the same direction, thus rotating the outer pressure piece 34 on the hub 36.

The member 34 is provided on its inner side with two inclined faces 37 and 38, these faces being formed in the periphery of the member 34 and are of the arrangement and shape best illustrated in Fig. 4. An inner pressure piece 39 is keyed onto the hub 36 by means of the keys 40 and 41, the pressure piece 39 being thus incapable of rotary movement with respect to the hub but capable of movement in a lateral direction. The inner pressure piece 39 is provided on its side which lies adjacent to the inclined faces 37 and 38 of the member 34, with two inclined faces 42 and 43, of the shape best shown in Fig. 3. The two inclined faces of the member 39 engage the correspondingly inclined faces 37 and 38 of the member 34 the face 37 lying against and sliding upon the face 42 and the face 38 lying against and sliding upon the face 43. By this construction, it will be seen that as the rod 32 is moved to the left, as shown in Fig. 2, resulting in the partial rotation of the outer pressure piece 34, the inclined faces of the outer pressure piece sliding upon those of the inner pressure piece 39 will cause the latter to be pressed inwardly, that is, laterally with reference to the axle 44 of the rear wheel. The pressure piece 39 is upwardly and outwardly flared, as is best shown in Fig. 1, this flared portion serving for the reception of a pressure ring 45 which forms a part of the ball thrust bearings. The latter also include the ball race 46 and the ring 47 which is disposed on an opposite side of the ball race to the position occupied by the ring 45. A circular disk 56 is located adjacent to the ring 47 and between the disk 56 and the outer end of the inner hub are disposed the friction disks, which will now be described. These consist of a series of concentric rings which, when the machine is at a standstill, will be more or less loosely arranged side by side. These friction disks consist of two sets 48 and 49, alternately arranged, the set of disks 48 being keyed upon the intermediate hub 50 by means of the keys 51, as is particularly shown in Fig. 1. The disks 48 will, of course, be incapable of rotation with reference to the intermediate hub 50 but they are capable of lateral or longitudinal movement thereon. The set of friction disks 49 are keyed upon the outer hub 31 by means of the keys 57 and are likewise incapable of rotation with reference to the outer hub, but are capable of lateral movement with respect thereto. A bevel gear 52 is secured to the intermediate hub 50 so as to turn with the latter, the bevel gear 52 being arranged on a ball race 53 which surrounds the outer portion of the inner hub 36. The spokes are attached to the outer hub 31 by means of the spoke flanges 54 and 55.

It will be seen from the foregoing description that as the inner pressure piece 39 is moved lengthwise of the inner hub 36 so as to force inwardly the ball thrust bearings and thus press the alternate sets of disks 48 and 49 closely together so that they frictionally engage each other, the intermediate hub 50, which is integral with the bevel gear 52 and rotates therewith, will carry with it the outer hub 31 through the agency of the closely gripped disks 49, and thus rotate the rear wheel of the machine. At the time this clutch mechanism is thrown into operation in the manner described by the movement of the left pedal 2 downwardly, the crank 4 will, at the same time, be moved to the right, as seen in Fig. 2, which will result in the spring barrel 21 moving to the right, as a result of the loosening of the tension of the coiled spring 23. This will move the bell crank lever 24 to the right, causing the brake band 29 to be loosened and the rear wheel will be permitted to rotate as soon as the clutch mechanism is rendered effective.

Having thus described the invention, what is claimed as new is:

1. In a motorcycle, a driving wheel, means for driving said wheel including a clutch, said clutch comprising a portion forming the outer hub of the wheel, an intermediate hub portion, a plurality of clutch disks interposed between the outer and intermediate hub portions and alternately keyed thereto, pedal controlled means for operating said disks, an inner hub portion for said driving wheel, a brake drum connected with said outer hub portion, a brake band adapted to pass around said brake drum, and connections between the brake band and the pedals whereby the band may be caused to engage the drum on the application of pressure to the pedals.

2. In a motorcycle, a driving wheel, means for driving said wheel including a clutch, said clutch comprising a portion forming the outer hub of the wheel, an intermediate hub portion, a plurality of clutch disks interposed between the outer and intermediate hub portions and alternately keyed thereto, connections between said clutch and the pedals whereby the clutch may be rendered operative on application of pressure to the pedals, brake mechanism for the driving wheel, and means for operating the latter from the pedals whereby it may be rendered inoperative when the clutch is rendered inoperative.

3. In a motorcycle, a driving wheel, means for driving said wheel including a clutch, an inner hub portion for said driving wheel, said clutch comprising a portion forming the outer hub of the wheel, an intermediate hub portion, a plurality of clutch disks interposed between said outer and intermediate hub portions and alternately keyed thereto, a pressure member arranged on said inner hub portion and capable of longitudinal movement thereon, a second pressure member, means carried by said two pressure members whereby the first named may be caused to move longitudinally on the rotation of the second named member, connections between said second named pressure member and the pedals whereby it may be rotated on the application of pressure to the pedals, a brake drum connected with said outer hub portion so as to rotate therewith, a brake band passing around said brake drum, and connections between said brake band and the pedals whereby the band may closely engage the brake drum on the application of pressure to the pedals.

4. In a motor cycle, a driving wheel comprising an inner, intermediate and outer hub portions, a gear wheel connected with said intermediate hub portion so as to turn therewith, a driving shaft, connections between said driving shaft and said gear wheel whereby the latter may be rotated, a plurality of disks disposed between the outer and intermediate hub portions, said disks consisting of two sets, the individual members of which are alternately keyed to said outer and intermediate hub portions, a pressure member keyed to said inner hub portion and capable of longitudinal movement thereon, thrust bearings between said pressure member and said disks, a second pressure member, said two pressure members being provided with inclined portions at their engaging ends whereby on the rotation of the second named pressure member the first named will be caused to move longitudinally so as to force said disks together, a brake drum connected with said outer hub portion and rotatable therewith, a brake band passing around said brake drum, a rod connected with the pedals and movable on the application of pressure to the pedals, a yielding connection between said rod and said brake band, and a rod connecting said second named pressure member with the pedals whereby said pressure may be rotated on the application of pressure to the pedals.

In testimony whereof I affix my signature in presence of two witnesses.

ROBERT L. BAILEY.

Witnesses:
JAMES O'CONNOR,
E. H. HOCNER.